United States Patent [19]
Enns

[11] Patent Number: 5,776,218
[45] Date of Patent: Jul. 7, 1998

[54] DUCT INSERTION FILTER

[76] Inventor: Victor Enns, 5796 Golden Road Crescent, Tsawwassen, British Columbia, Canada, V4L 2H6

[21] Appl. No.: 752,797

[22] Filed: Nov. 20, 1996

[51] Int. Cl.⁶ .................................................. B01D 35/02
[52] U.S. Cl. ................. 55/495; 55/DIG. 31; 55/DIG. 35
[58] Field of Search ........................... 55/274, 484, 486, 55/492, 497, 500, 501, DIG. 31, DIG. 35, 495, 511, 504; 210/167, 168

[56] References Cited

U.S. PATENT DOCUMENTS

| | | | |
|---|---|---|---|
| 1,694,089 | 12/1928 | Wright | 55/DIG. 35 |
| 2,825,500 | 3/1958 | McLean | 55/DIG. 31 |
| 5,100,445 | 3/1992 | Johnson et al. | 55/413 |
| 5,167,677 | 12/1992 | Hammes | 55/DIG. 35 |
| 5,173,094 | 12/1992 | Brady | 55/233 |
| 5,216,822 | 6/1993 | Madiedo | 55/385.1 |
| 5,240,487 | 8/1993 | Kung | 55/486 |
| 5,350,444 | 9/1994 | Gould | 96/154 |
| 5,417,743 | 5/1995 | Dauber | 96/13 |
| 5,421,862 | 6/1995 | Davis | 95/273 |
| 5,462,569 | 10/1995 | Benjamin | 55/385.6 |
| 5,509,950 | 4/1996 | Van De Graaf et al. | 55/486 |
| 5,597,392 | 1/1997 | Hawkins et al. | 55/DIG. 35 |

*Primary Examiner*—Richard L. Chiesa
*Attorney, Agent, or Firm*—Norman M. Cameron

[57] ABSTRACT

A filter unit is provided for a forced air heating duct having an inside and an outlet end with a register. The unit includes a frame having a tapered body shaped to wedge within the duct adjacent the register. A filter is shaped to fit inside the duct and is disposed entirely between the duct and the register. The filter can be replaced by removing the register, while leaving the frame in place.

3 Claims, 2 Drawing Sheets

DUCT INSERTION FILTER

BACKGROUND OF THE INVENTION

This invention relates to filters for forced air ventilating ducts.

Dust often accumulates in forced air heating and air conditioning ducts. Forced ventilation filters are not 100% effective and, accordingly, considerable dust and other particulate matter enters the ducts and is circulated through the building during operation of the furnace or air conditioner.

In order to combat this problem, filters have been developed which are fitted to the vent adjacent the discharge end of the duct. Most currently available filters fit in the register which is typically located at the discharge end of a duct in the floor of a dwelling or other building. These filters often separate from the sides of the register when the register is opened, allowing for passage of dust at the most critical time. Also, it is frequently difficult to remove and replace these filters. Entrapped dust can often be dislodged and become airborne when the filter is removed from the register.

One example of a prior art filter is found in U.S. Pat. No. 5,240,487 to Kung. A frame is fitted with a sleeve-like filter. The frame, with filter fitted thereon, is inserted into the duct below the register. The unit is held in place by a friction fit. However, it is necessary to remove the entire frame in order to change the filter. It may be difficult to grasp and remove the frame which may become jammed in the duct. Alternatively there is a possibility that the frame will become dislodged and drop into the duct too far to be removed.

It is an object of the invention to provide an improved filter unit for a forced air ventilation duct which allows the filter to be easily replaced.

It is also an object of the invention to provide an improved filter unit for a forced air ventilation duct which permits the filter to be removed without disturbing dust trapped by the filter.

It is a further object of the invention to provide an improved filter f or forced air ventilation ducts which is out of sight and, accordingly, aesthetically pleasing.

It is a still further object of the invention to provide an improved filter unit for forced air ventilation ducts which is rugged in construction and simple and economical to produce and sell.

SUMMARY OF THE INVENTION

In accordance with these objects, there is provided a filter unit for a forced air ventilation duct having an inside and an outlet end with a register. The unit comprises a frame having a tapered body shaped to wedge within the duct adjacent the register. A filter is shaped to fit the inside of the duct and is located between the frame and the register.

There is provided, according to another aspect of the invention, a filter unit for a forced air ventilation duct having an inside and a l outlet end with a register. The unit comprises a frame shaped to tightly fit inside the duct directly against the duct. There is a filter entirely disposed between the frame and the register.

There is also provided, according to a further aspect of the invention, a forced air ventilation apparatus. The apparatus comprises a duct having a discharge end. A register is fitted to the duct adjacent the discharge end thereof. A frame is releasably fitted within the duct and spaced-apart from the register. A filter is entirely disposed between the register and the frame, whereby the filter can be replaced by removing the register, while leaving the frame in place.

The frame is preferably wedge-shaped and tightly fitted within the duct. The frame may be of plastic.

In a preferred form of the invention, there is a fastener which releasably connects the filter to the frame. The fastener may be a hook and loop-type fastener.

The invention offers significant advantages over the prior art. The frame may be semi-permanently installed in the duct and need not be disturbed to change the filter. The filter can be removed simply by taking the register off of the duct, grasping the filter and pulling it out without dislodging the frame.

Once installed, the filter and frame unit is entirely out of sight and, accordingly, only the register is visible from outside the duct.

The use of fasteners to connect the filter to the frame means that the filtering effect is not reduced by unfiltered air passing between the duct and the filter. The frame can be tightly wedged in the duct to prevent any significant passage of air around the frame. The use of a wedge-shaped frame means that the frame is not likely to become dislodged once it is inserted in the duct. This removes the likelihood that the frame will drop into the duct where it cannot be easily accessed from the exterior.

Even though the invention offers these significant advantages, it requires only two principal components, a relatively inexpensive filter and a simple, economical frame which can be conveniently molded as a single piece.

DESCRIPTION OF THE PREFERRED EMBODIMENTS

FIG. I shows a forced air ventilation apparatus 10 according to an embodiment of the invention. In this case the apparatus is a forced air heating apparatus. This includes a conventional heating duct 12 having a discharge end 14 located in floor 16 of a dwelling. It should be understood however that the duct can be located in a ceiling, wall or other such location in a building and can be other shapes and configurations besides the illustrated embodiment. The duct extends either directly to a forced air furnace (not shown) or to a larger duct which extends to the furnace. Also the invention is applicable to air conditioning ducts and other forced air ventilation ducts.

Figure 2:
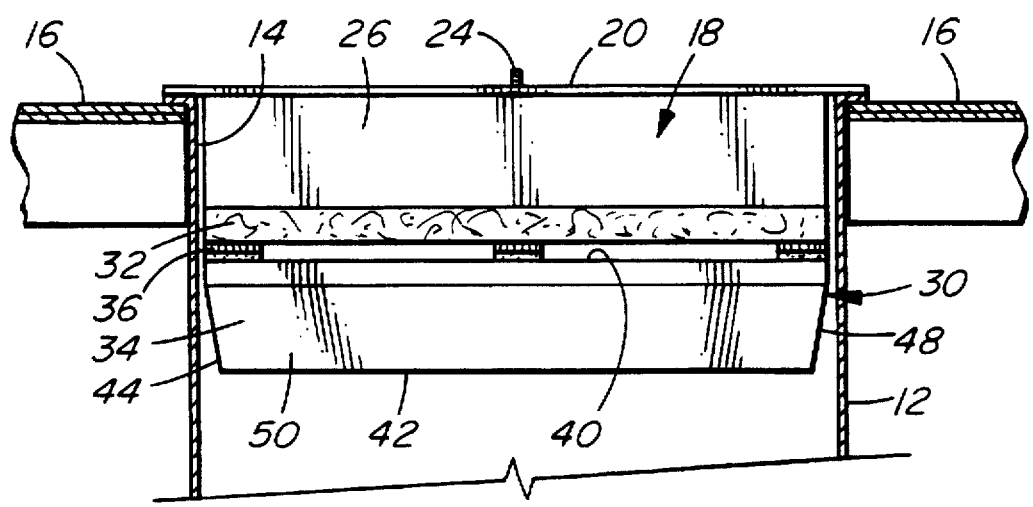
FIG. 2 is a side elevation thereof with the duct shown in section.

The apparatus 10 also includes a conventional register 18 which is typically made of sheet metal. The register has an outer frame 20 exterior to the duct and a plurality of spaced-apart fins 22 which form a grill for discharging and directing air from the duct. There is a control knob 24 which moves one or more interior flaps (not shown) to control the direction and amount of air discharged from the register. The register also has a sleeve 26 which fits inside the duct as best seen in FIG. 2. As described so far, the apparatus is conventional.

The apparatus 10 however is distinguished from the prior art in that it is equipped with a filter unit 30 which includes a filter 32 and a frame 34, look and loop-type fasteners 36 connect the filter to the frame.

Referring to the frame in more detail, it has an outer end 40 which is adjacent the register as seen best in FIG. 2. The frame also has an inner end 42 which is distal the register. The frame has four sides 44, 46, 48 and 50 which taper towards the inner end 42 as best seen for sides 44 and 48 in FIG. 2. Thus the inner end 42 is smaller than the outer end 40 of the frame. For illustrative purposes a gap is shown between the frame and the duct 12 in FIG. 2. However, in actual use, the frame would be jammed in the duct. The tapering of the frame allows the frame to be inserted in the duct and pushed into the duct so it is securely held in the position shown in FIG. 2 inside the duct and spaced-apart slightly from the register to allow room for the filter. The frame is preferably made of a semi-rigid plastic which has the flexibility to allow the frame to be inserted into the duct, but remain firmly in place once inserted unless removal is required for maintenance or some other such purpose.

Figure 1:
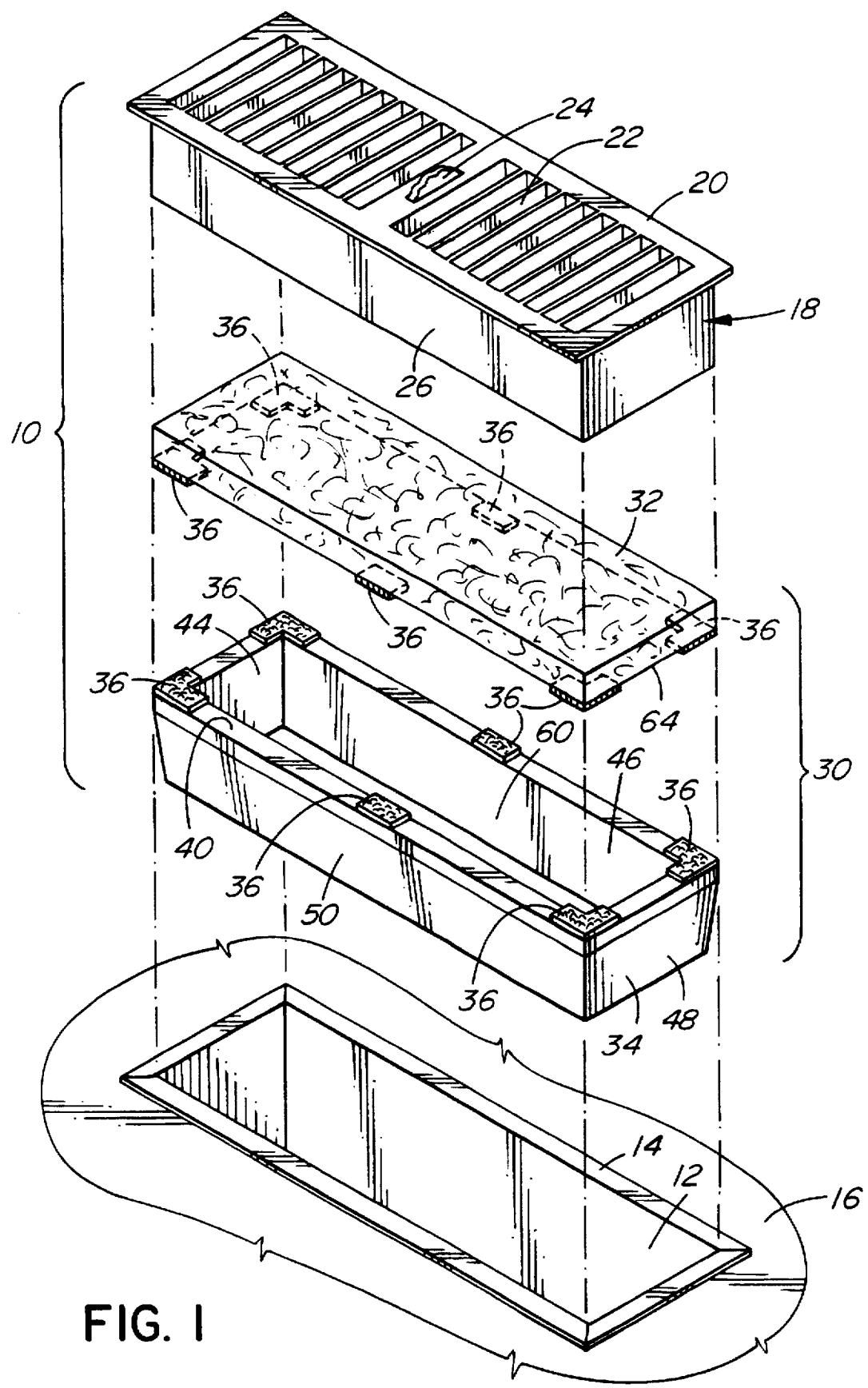
FIG. 1 is an exploded view of a forced air ventilation apparatus according to an embodiment of the invention.

As best seen in FIG. 1, the frame is rectangular in shape with a rectangular central opening 60 in this embodiment. The frame is relatively thin about the opening, thus allowing for a relatively unhindered flow of air through the duct.

The filter 32 is also rectangular in shape in this embodiment to conform tightly to the inside of a duct. In this embodiment the filter is made of an unwoven fabric, polyester in this particular case. However other filter mediums such as paper or felt could be substituted.

There is a plurality of the hook and loop-type fasteners 36 best shown in FIG. 1. In this particular example the hook and loop-type fasteners are located adjacent the corners of the frame on the outer end thereof and midway between the corners on the longer sides 46 and 50. The complementary portions of the fasteners are located in similar positions on rectangular, inner side 64 of the filter 32.

Either the hook portion or loop portion of each fastener may be located on the filter with the other portion being located on the fra me. The fasteners can be located in other places on the two components or entirely extend about the frame. Other types of fasteners can also be substituted such as snap fasteners, tapered plugs and sockets or the like. Fasteners can be omitted in other embodiments of the invention.

The filter unit is installed by first removing the register 18 from the duct. The frame 34 is then inserted into the duct and is pushed through the duct with sufficient force to lodge it in place just below the register. Sufficient room is allowed to insert the filter 32.

Once the frame is in place, the filter 32 is positioned on the frame and held in place by the fasteners 36. The register 18 is then repositioned within the duct so the apparatus is fully assembled as shown in FIG. 2.

Thereafter, when replacement of the filter is required, this can be accomplished merely by removing the register 18. The user can grasp the filter 32 and lift it outwardly, breaking the bond between the components of the fasteners 36. The filter can be cleaned or replaced with a new filter which is then placed on top of the frame and secured by the fasteners again. The register is then replaced. It should be noted that the filter can therefore be removed and replaced without any need to remove or reposition the frame.

It will be understood by someone skilled in the art that some of the features described above are by way of example only and are not intended to limit the scope of the invention which is to be interpreted with reference to the following claims.

What is claimed is:

1. A forced air ventilation apparatus comprising:
   a forced air ventilation duct having an inside and an outlet end;
   a register fitted to the duct outlet end;
   a frame having a tapered body shaped to wedge within the duct adjacent the register, the frame having an outer end facing the register and an inner end distal the register, the frame having sides which taper such that the inner end is smaller than the outer end;
   a filter shaped to fit the inside of the duct and located between the frame and the register, said filter being replaceable by removing the register while leaving the frame in place; and
   a hook and loop fastener which connects the filter to the frame.

2. A unit as claimed in claim 1, wherein the frame is rectangular, having a rectangular central opening.

3. A unit as claimed in claim 2, wherein the frame is of plastic.

* * * * *